(12) United States Patent
Ananchaperumal

(10) Patent No.: US 9,300,728 B1
(45) Date of Patent: Mar. 29, 2016

(54) CONTROLLING RESOURCE DEPLOYMENT THRESHOLDS IN A DISTRIBUTED COMPUTER SYSTEM

(71) Applicant: CA, Inc., Islandia, NY (US)

(72) Inventor: Dhesikan Ananchaperumal, Shrewsbury, MA (US)

(73) Assignee: CA, Inc., New York, NY (US)

( * ) Notice: Subject to any disclaimer, the term of this patent is extended or adjusted under 35 U.S.C. 154(b) by 220 days.

(21) Appl. No.: 14/053,268

(22) Filed: Oct. 14, 2013

(51) Int. Cl.
G06F 15/173 (2006.01)
H04L 29/08 (2006.01)
H04L 12/911 (2013.01)
G06F 9/50 (2006.01)

(52) U.S. Cl.
CPC .............. *H04L 67/10* (2013.01); *G06F 9/5011* (2013.01); *H04L 29/08144* (2013.01); *H04L 47/783* (2013.01); *G06F 9/5061* (2013.01); *G06F 9/5072* (2013.01)

(58) Field of Classification Search
CPC .................. G06F 9/50–9/5055; G06F 9/5072; H04L 47/781; H04L 47/783
See application file for complete search history.

(56) References Cited

U.S. PATENT DOCUMENTS

| | | | | |
|---|---|---|---|---|
| 2005/0005019 A1* | 1/2005 | Harville | ................... | H04L 29/06 709/231 |
| 2005/0157644 A1* | 7/2005 | Johansson | ............... | H04L 47/72 370/229 |
| 2005/0198099 A1* | 9/2005 | Motsinger | ............... | G06F 21/55 709/200 |
| 2010/0070784 A1* | 3/2010 | Gupta | ................... | G06F 1/3203 713/310 |
| 2010/0169720 A1* | 7/2010 | Lumpp | ............... | G06F 11/2028 714/50 |
| 2013/0129068 A1* | 5/2013 | Lawson | ................... | H04M 3/00 379/242 |
| 2014/0019972 A1* | 1/2014 | Yahalom | ............. | H04L 67/1097 718/1 |
| 2014/0282824 A1* | 9/2014 | Lango | ..................... | H04L 63/20 726/1 |
| 2015/0058967 A1* | 2/2015 | Ringdahl | ............ | H04L 63/0263 726/11 |

* cited by examiner

*Primary Examiner* — Jeong S Park
(74) *Attorney, Agent, or Firm* — Myers Bigel & Sibley, P.A.

(57) ABSTRACT

Some embodiments disclosed herein are directed to a resource management node that controls deployment of resource nodes in a distributed computing system. The resource management node includes a processor and a memory having computer readable program code that when executed by the processor causes the processor to perform operations that include deploying a group of resource nodes in a distributed computing system, and distributing requests received from the user electronic devices to the resource nodes of the group for processing. A resource deployment threshold is determined based on performance parameters of the resource nodes of the group, and a loading metric is determined based on the request. The operations include controlling further deployment of resource nodes to the group responsive to comparison of the loading metric to the resource deployment threshold. Related methods in a resource management node are disclosed.

23 Claims, 5 Drawing Sheets

CONTROLLING RESOURCE DEPLOYMENT THRESHOLDS IN A DISTRIBUTED COMPUTER SYSTEM

TECHNICAL FIELD

The present disclosure relates to computer systems, and in particular to controlling deployment of resources within a distributed computing system.

BACKGROUND

Distributed computing systems, sometimes also referred to as cloud computing systems, are used to provide services to electronic devices operated by end users. In a cloud computing system, the hardware and software computer resources configuration is hidden from the end user. Cloud computing systems may include servers, network storage devices, routers, gateways, communication links, and other physical hardware and software platforms. However, because services are deployed on physical hardware and software platforms which are hidden from end users, they can be managed, upgraded, replaced or otherwise changed by a system administrator without the end users being aware of or affected by the change.

In existing cloud and other distributed computing systems, the creator of services or the operator of the cloud system must know in advance which applications (or types of applications) will be deployed and provide associated instructions for the number and types of resources that are deployed in the cloud system to support processing of the applications. During operation, a load balancer can operate to direct requests from user electronic devices to particular ones of the resources for processing by the associated applications. Although load balancers can provide better balancing of resource utilization, they may not sufficiently improve the efficiency at which resources are deployed and used, which may have a substantial effect on cost in view of the potential large number of resources that can be deployed in some distributed computer systems.

SUMMARY

Some embodiments disclosed herein are directed to a resource management node that controls deployment of resource nodes in a distributed computing system. The resource management node includes a processor and a memory having computer readable program code that when executed by the processor causes the processor to perform operations that include deploying a group of resource nodes in a distributed computing system, and distributing requests received from the user electronic devices to the resource nodes of the group for processing. A resource deployment threshold is determined based on performance parameters of the resource nodes of the group, and a loading metric is determined based on the request. The operations further include controlling further deployment of resource nodes to the group responsive to comparison of the loading metric to the resource deployment threshold.

Related methods in a resource management node are disclosed. It is noted that aspects described with respect to one embodiment may be incorporated in different embodiments although not specifically described relative thereto. That is, all embodiments and/or features of any embodiments can be combined in any way and/or combination. Moreover, other resource management node, load balancers, systems, methods, and/or computer program products according to embodiments will be or become apparent to one with skill in the art upon review of the following drawings and detailed description. It is intended that all such additional resource management node, load balancers, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

At any particular instance, the number of requests from user electronic devices that are being handled by a distributed computer system may be small relative to the number of servers and other resource nodes that have been deployed to process those such requests. Indeed, in prior art system, the number of servers and other resource nodes that are deployed is determined based on a maximum number of anticipated/allowed requests from user electronic devices that will be simultaneously processed. Such resource allocation inherently results in inefficiencies during non-peak request processing.

Figure 1:
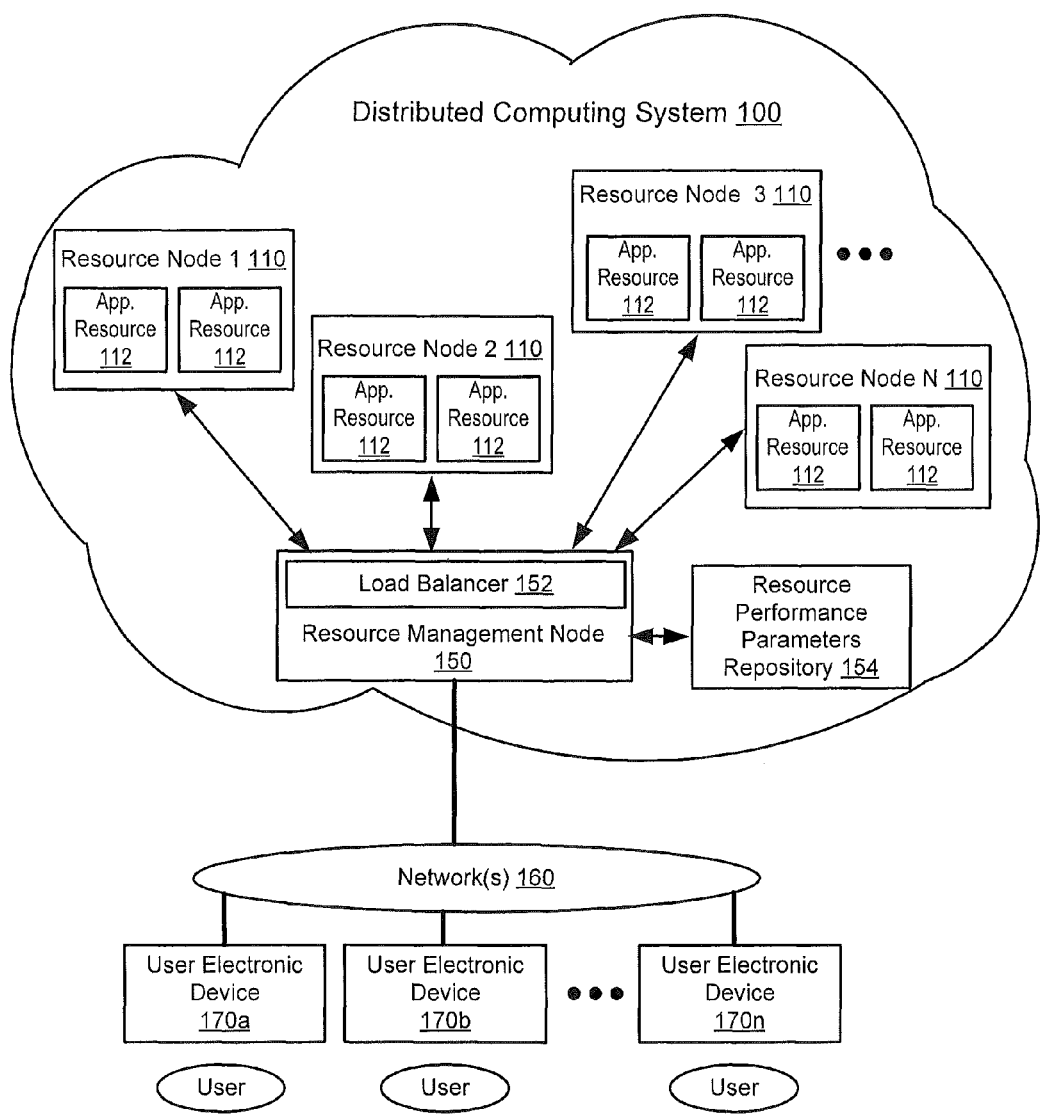
FIG. 1 is a block diagram of a distributed computer system that controls deployment of resources nodes to process requests from electronic devices, in accordance with some embodiments.

Some embodiments are directed to improving management of when resources in a distributed computing system are deployed and shut-down for processing requests from user electronic devices. FIG. 1 illustrates a non-limiting example distributed computing system 100 that receives requests from user electronic devices 170a-170n via one or more networks 160 for processing. The distributed computing system 100 includes a plurality of resource nodes 110 and a resource management node 150. The user electronic devices 170a-170n may include, but are not limited to, desktop computers, laptop computers, tablet computers, wireless mobile terminals (e.g., smart phones), gaming consoles, networked televisions with on-demand media request capability. The resource nodes 110 can include, but are not limited to, network content servers (e.g., Internet website servers, movie/television programming streaming servers, application program servers), network storage devices (e.g., cloud data storage servers), network data routers, gateways, communication interfaces, program code processors, memories, display devices, and/or communication interfaces. The resource nodes 110 may execute one or more application resources 112, which may include, but are not limited to user accessible applications, websites, web services, operating systems, etc.

Although N resource nodes 110 and user electronic devices 170 have been illustrated in FIG. 1, any plural number may be used therewith. For some distributed computing systems 100, the number of resource nodes 110 can number more than a hundred or thousand and the number of user electronic devices 170 can number more than a thousand or hundred thousand.

A load balancer 152 may reside in the resource management node 150 and operate to distribute individual requests that are received from the user electronic devices 170a-n to particular ones of the resource nodes 110 selected by the load balancer 152 for processing. The load balancer 152 may further operate to control distribution of the individual requests to particular ones of the application resources 112 selected by the load balancer 152 on particular ones of the resource nodes 110 for processing. The load balancer 152 may select among the resource nodes 110 and/or the application resources 112 for distributing individual requests responsive to the present loading of the resource nodes 110 and/or the application resources 112, where the loading may be determined based on the amount of processing resources, volatile memory resources, non-volatile mass storage resources, communication resources, and/or application resources that are utilized to process the requests. The load balancer 152 may, for example, operate to distribute the requests responsive to comparison of the relative loading characteristics of the resource nodes 110 (e.g., to attempt to obtain a more balanced loading across the resource nodes 110, to avoid one of the resource nodes 110 operating at more than a threshold loading above other ones of the resource nodes 110, etc.).

To distribute the requests, the load balancer 152 can map an address of the distributed computing system 100, which is received in the requests (e.g., a communication packet destination address header), to a plurality of addresses of the resource nodes 110. For example, the load balancer 152 can have an external IP address that is mapped to a domain name system (DNS) name, Fully Qualified Domain Name (FQDN). The load balancer 152 redirects one of the incoming requests identifying the external IP address to one of the mapped IP addresses of one of the resource nodes 110.

The load balancer 152 can select among the mapped IP addresses of the resource nodes 110 to process redirected requests based on rules defined to obtain defined loading or relative loading of the resource nodes 110 and/for application resources 112 thereon. The load balancer 152 may apply various defined rules to redirect incoming user requests to the available resource nodes. The load balancing rules can include: 1) round robin; 2) percentage thresholds (e.g., load first resource nodes until a defined threshold load is reached, then direct further request to the next resource nodes, etc.), and other load balancing rules.

The resource management node 150 may provide logical load shedding based on an observed number of requests received from the user equipment devices 170a-n and/or a predicted near-term number of incoming requests.

The resource management node 150 controls which and how many of the resource nodes 110 are available for use by the load balancer 152 for distributing requests from the user electronic devices 170a-n for processing.

In accordance with one embodiment, the resource management node 150 determines how many resource nodes (e.g., servers) are needed based on: 1) an observed number of incoming user requests ("load"); and 2) a tolerance threshold. When the resource management node 150 determines that more resource nodes are needed than the presently observed load (e.g., a present load exceeding a first tolerance threshold), it starts-up one or more additional resource nodes. Similarly, when the resource management node 150 determines that less resource nodes are needed than the presently observed load (e.g., a present load is less than a second tolerance threshold), it shuts-down one or more of the resource nodes that are available to process requests.

The first and second tolerance thresholds define a tolerance window. The first tolerance threshold may define a condition under which the resource management node 150 is to startup or otherwise bring on-line a selected one of the resource nodes 110 to begin processing incoming requests. In contrast, the second tolerance threshold may define a condition under which the resource management node 150 is to shut down or otherwise control a selected one of the resource nodes 110 to cease being immediately available to process incoming requests. The resource management node 150 can define or modify one or more values of the tolerance window based on one or more of the following factors that may include, but are not limited to: 1) time to start-up and bring on-line an additional resource nodes; 2) rate of change of user requests; 3) rates or processing errors of on-line resource nodes; and/or 4) performance versus request load trend.

In one embodiment, the resource management node 150 controls the first tolerance threshold responsive to the time to start-up and bring on-line an additional resource node. For example, if a server node or other selected resource node takes a relatively longer time to come on-line (e.g., determined based on the server's known performance attributes), the threshold can be decreased for that type of server to trigger earlier start-up when an additional server resource is needed. Earlier start-up can ensure that the server is available for use before overloading of the presently active servers occurs.

In another embodiment, the resource management node 150 controls the first and second tolerance thresholds responsive to the rate of change of user requests. For example, recent and present trends in numbers of incoming requests can be extrapolated forward to predict near-term requirements for the number and types of resource nodes that are on-line available for processing incoming requests, and/or such trends can be compared to historically observed trends to statistically predict near-term resource nodes requirements.

In another embodiment, the resource management node 150 controls the first and second tolerance thresholds responsive to error rates or processing errors of on-line resource nodes. For example, if one of the on-line resource nodes is presently observed to be experiencing error conditions which may affect its processing performance attributes and/or has a history of having error conditions when subject to certain processing loading, then the first threshold can be decreased to trigger start-up of an additional resource node to avoid higher utilization of that resource node or other on-line resource nodes.

In another embodiment, the resource management node 150 controls the first and second tolerance thresholds responsive to performance versus request load trends. For example, the threshold may be lowered when a resource node reaches a defined threshold loading where that resource node is known to exhibit a roll-off of performance capability with each incremental load increase beyond the defined threshold loading (e.g., when a linear relationship between number of requests and resource node performance degrades to a non-linear relationship (e.g., step-wise or other drop in available resource node processing capability).

In another embodiment, the resource management node 150 determines a resource deployment threshold based on at least one of a defined maximum number of the requests that one of the resource nodes 110 of the group can simultaneously process, an amount of memory available for one of the resource nodes 110 of the group to process the requests, and an amount of throughput available for one of the resource nodes 110 of the group to process the requests.

The resource management node 150 may adjust the tolerance window between the first and second thresholds based on learned events over time. For example, patterns between observed loading and time of day, day of week, etc, can be learned and used to adjust the tolerance window in anticipation of predicted loading. Moreover, the resource management node 150 may learn statistical trends between observed patterns of user requests and future loading. For example, the load balancer may extrapolate or perform other curve fitting algorithms to predict near-term future loading that may be experience by the resource nodes, and can adjust the tolerance windows accordingly to determine whether resource nodes should be started-up or shut-down.

Figure 2:
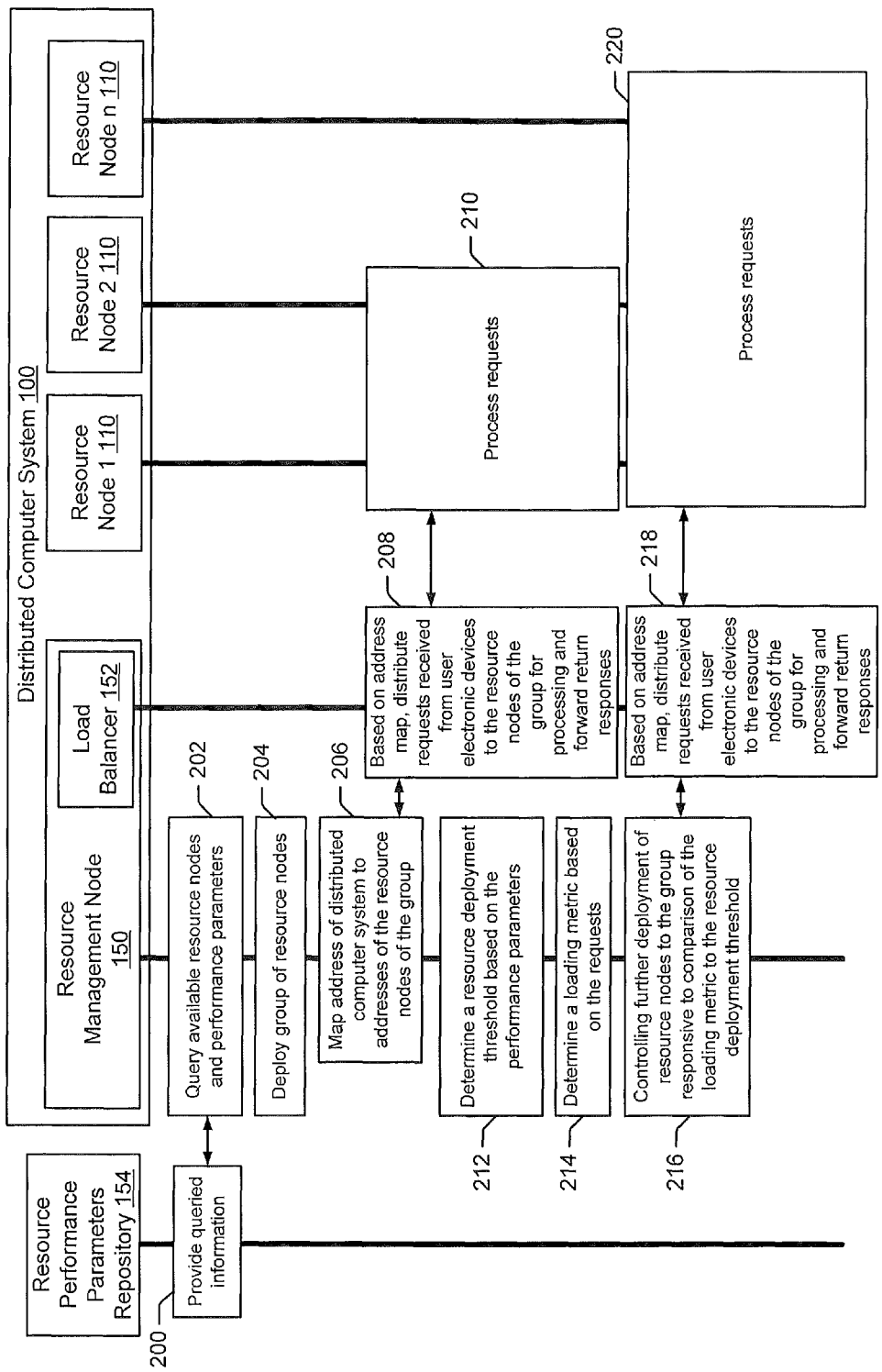
FIG. 2 is flowchart and data flow diagram of operations by a resource performance parameters repository, a resource management node, and resource nodes of a distributed computer system, in accordance with some embodiments.
Figure 3:
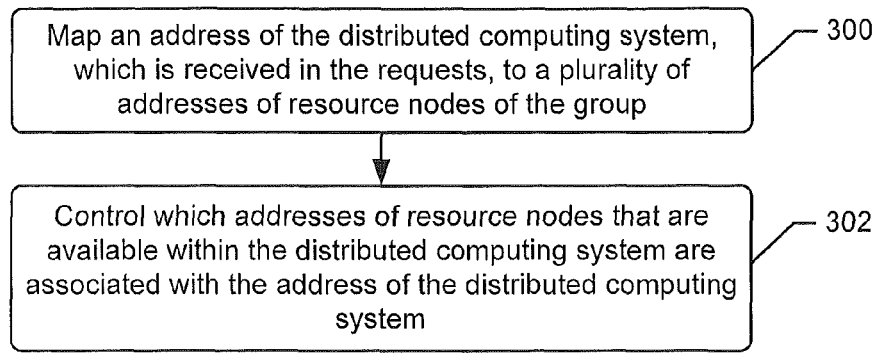
FIGS. 3-9 are flowcharts that illustrate operations for controlling deployment of resources within a distributed computing system according to some embodiments.
Figure 4:
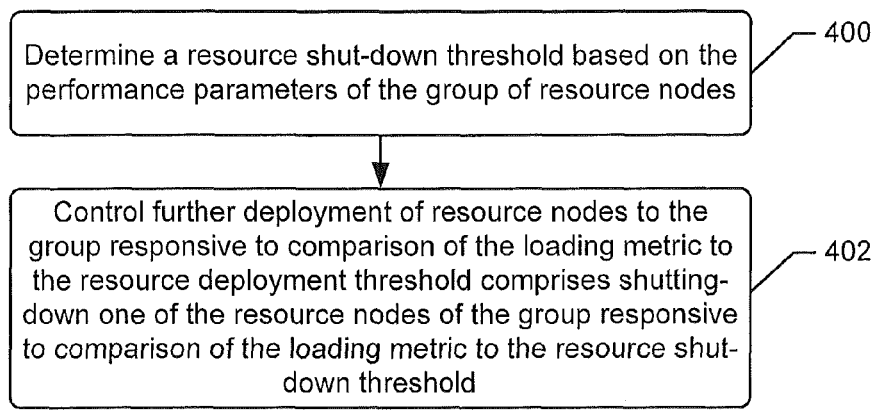
Figure 5:
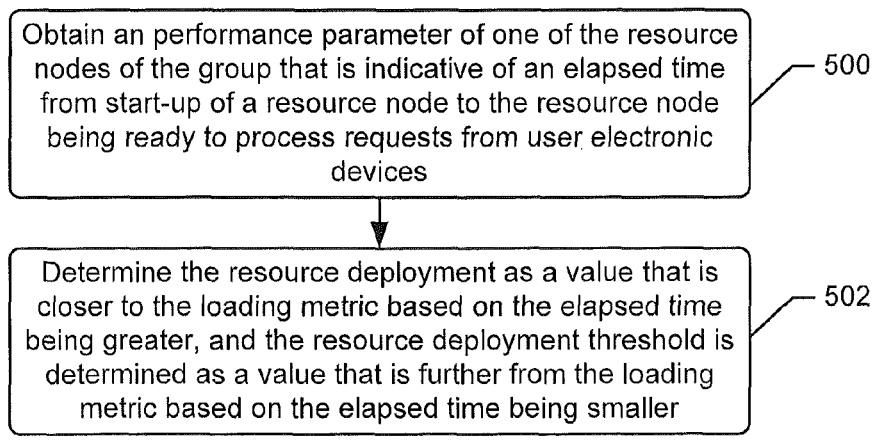
Figure 6:
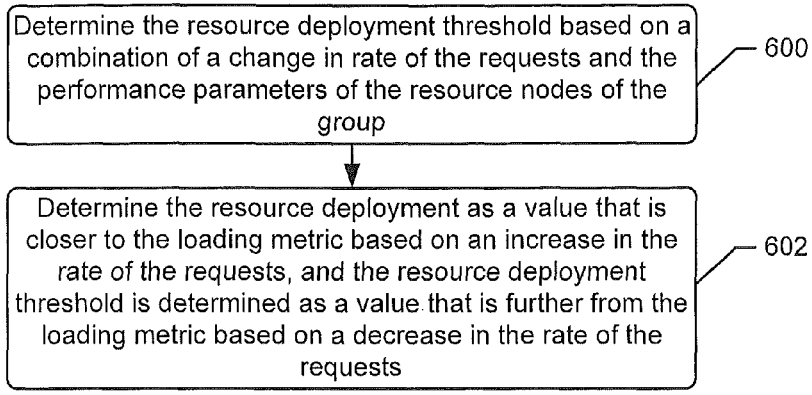
Figure 7:
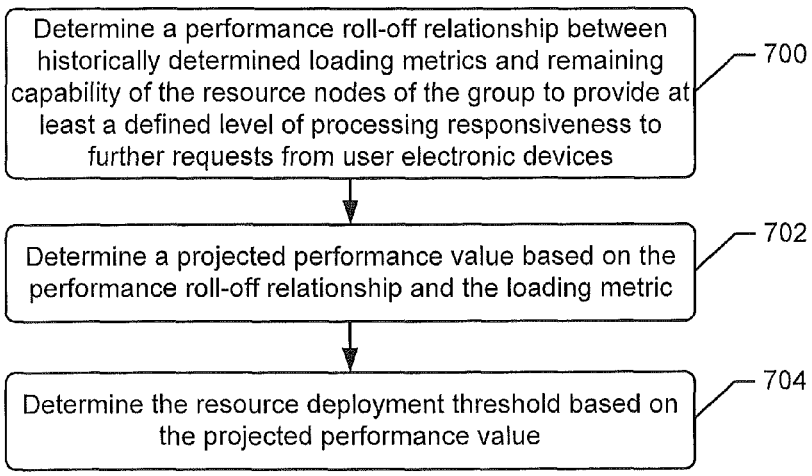
Figure 8:
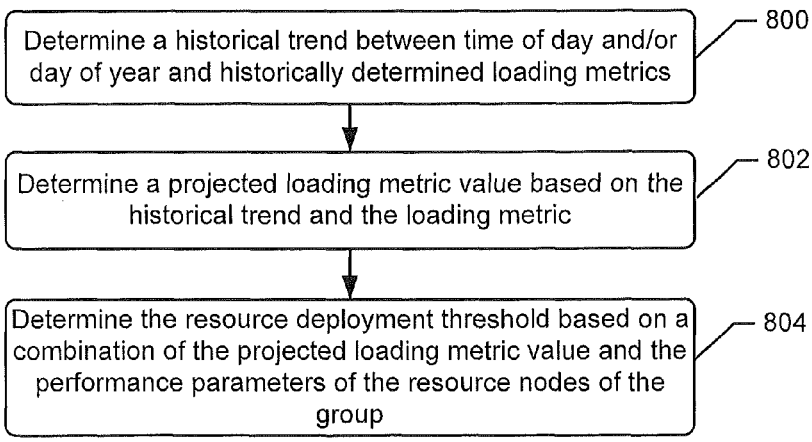
Figure 9:
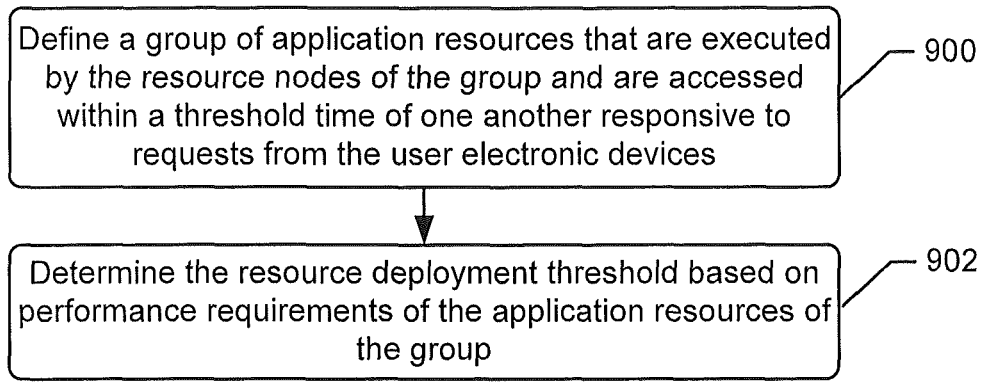

These and other embodiments are explained in further detail with reference now to FIGS. 2-9. FIG. 2 is flowchart and data flow diagram of operations by a resource performance parameters repository 154, a resource management node 150, and resource nodes 110 of a distributed computer system 100, in accordance with some embodiments. FIGS. 3-9 are flowcharts that illustrate operations for controlling deployment of resources within a distributed computing system 100 according to some embodiments.

The resource performance parameters repository 154 contains information that identifies performance parameters of the resource nodes 110. For example, the repository 154 can identify for each of the resource nodes 110, number of resource nodes 110, characteristics (e.g., type of server node, mass storage node, etc.), start-up time to be brought on-line available to process incoming requests (e.g., elapsed time from start-up of a resource node 110 to being ready to process requests from the user electronic devices 170a-n), shut-down time to shut down from a present on-line state, processing throughput, volatile memory resources, non-volatile mass storage resources, communication input/output resources, and/or application resources.

The resource management node 150 queries (block 202) the repository 154 to obtain information identifying the available resource nodes and each of their performance parameters. The resource management node 150 deploys (block 204) a group of the resource nodes 110 in the distributed computing system 100 responsive to the information. To deploy the resource nodes 110, the resource management node 150 can map (blocks 206 and 300) an address of the distributed computing system 110, which is received in the requests, to a plurality of addresses of resource nodes 110 of the group.

Based on the address mapping, the load balancer 152 of the resource management node 150 can distribute (blocks 208) requests received from the user electronic devices 170 to selected ones of the resource nodes 110 of the group for processing (e.g., processing by resource nodes 1 and 2 at block 210) (e.g., as described above according to one or more load balancing roles), and can further forward return responses from the resource nodes 110 to the user electronic devices 170 based on the address mapping.

The resource management node 150 determines (block 212) a resource deployment threshold based on performance parameters of the resource nodes 110 of the group. A resource deployment threshold can be defined individually for each of the resource nodes 110 of the group or may be defined based on a combination of the performance parameters for a plurality or all of the resource nodes 110 of the group. A loading metric is determined (block 214) based on the requests received from the resource nodes 110.

The resource management node 150 controls (block 216) further deployment of resource nodes 110 to the group responsive to comparison of the loading metric to the resource deployment threshold. In one embodiment, the resource management node 150 controls (block 302) which addresses of resource nodes 110 that are available (e.g., either on-line or can be started-up to become on-line) within the distributed computing system 100 are associated with the address of the distributed computing system 100. The load balancer 152 distributes (e.g., as described above selecting among the resource nodes 110 available within the mapping according to one or more load balancing roles) requests received from the user electronic devices 170 to the resource nodes 110 of the group for processing (e.g., processing by resource nodes 1, 2, . . . n at block 220) based on the address mapping, and can further forward return responses from the resource nodes 110 to the user electronic devices 170 based on the address mapping.

As explained above, a resource shut-down threshold can be determined (block 400) based on the performance parameters of the resource nodes 110 of the group. The resource management node 150 may control further deployment of resource nodes 110 to the group by shutting-down (block 402) one of the resource nodes 110 of the group responsive to comparison of the loading metric to the resource shut-down threshold.

The performance parameter of one of the resource nodes 110 of the group obtained (block 500) from the repository 154 may be indicative of an elapsed time from start-up of the resource node 110 to that resource node 110 being ready to process requests from user electronic devices. The resource management node 150 may determine (block 502) the resource deployment threshold as a value that is closer to the loading metric based on the elapsed time being greater, and determine the resource deployment threshold as a value that is further from the loading metric based on the elapsed time being smaller. Accordingly, when one of the resource nodes 110 takes the greater amount of time to start up to become available for processing request, the resource deployment threshold can be reduced so that initiation of the resource node 110 occurs at a lower metric level. Conversely, when that resource node 110 takes a lesser amount of time to start up to become available for processing requests, the resource deployment threshold can be increased so that initiation of the resource node 110 occurs at a higher metric level.

The resource deployment threshold may be determined (block 600) based on a combination of a change in rate of the requests received from the user electronic devices to be processed by the resource nodes 110 of the group and the performance parameters of the resource nodes 110 of the group. The resource management node may determine (block 602) the resource deployment threshold as a value that is closer to the loading metric based on an increase in the rate of the requests, and determine the resource deployment threshold as a value that is further from the loading metric based on a decrease in the rate of the requests.

The resource deployment threshold may be determined based on a combination of a number of errors detected from the resource nodes 110 of the group processing requests received from the user electronic devices 170 and the performance parameters of the resource nodes 110 of the group. The errors can include one of failed login attempts by the user electronic devices to application resources processed by the resource nodes 110 of the group, the requests identifying resource node addresses which are not accessible among the resource nodes 110 of the group, and communication errors between the resource nodes 110 of the group and the user electronic devices 170.

The resource deployment threshold may be determined based on a combination of a history of the resource nodes 110 of the group experiencing errors when processing requests at a threshold loading metric and the performance parameters of the resource nodes 110 of the group.

The resource management node 150 may determine (block 700) a performance roll-off relationship between historically determined loading metrics and remaining capability of the resource nodes 110 of the group to provide at least a defined level of processing responsiveness to further requests from the user electronic devices 170. A projected performance value is determined (block 702) based on the performance roll-off relationship and the loading metric. The resource management node 150 determines (block 704) the resource deployment threshold based on the projected performance value.

The resource management node 150 may determine (block 800) a historical trend between time of day and/or day of year and historically determined loading metrics, and determine (block 802) a projected loading metric value based on the historical trend and the loading metric. The resource management node 150 can then determine (block 804) the resource deployment threshold based on a combination of the projected loading metric value and the performance parameters of the resource nodes 110 of the group.

The resource management node 150 may define (block 900) a group of application resources 112 that are executed by the group of resource nodes 110 and are accessed within a threshold time of one another responsive to requests from the user electronic devices 170, and may determine (block 902) the resource deployment threshold based on performance requirements of the application resources of the group. Accordingly, the resource deployment threshold may be defined based on one or more performance characteristics of one or more of the application resources 112 that can be used to process requests from the user electronic devices 170.

Although various example performance parameters have been provided herein based on which the resource deployment threshold can be determined, such determination is not limited thereto. In some other embodiments, the resource deployment threshold is determined based on at least one of a defined maximum number of the requests that one of the resources of the group can simultaneously process, an amount of memory available for processing the requests, and an amount of throughput available for processing the requests.

Example Control Node

Figure 10:
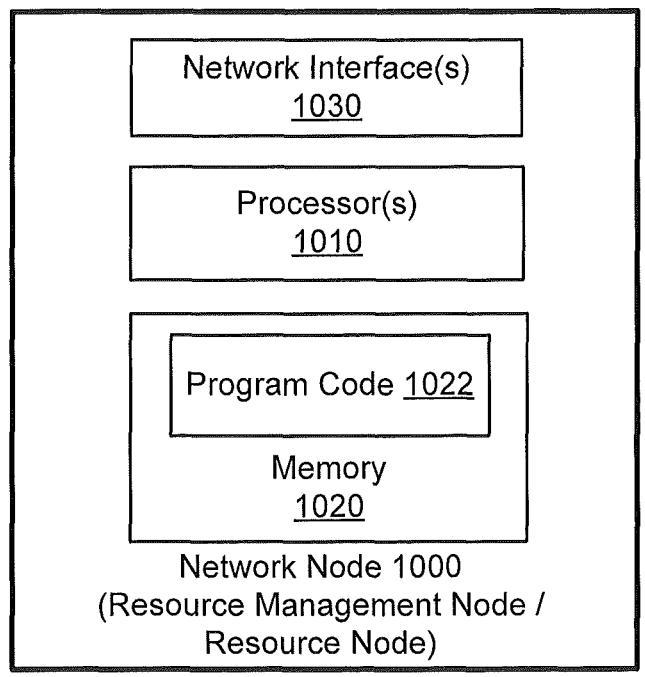
FIG. 10 is a block diagram of a network node which may be used as a resource management node and/or a resource node that is configured according to some embodiments.

FIG. 10 is a block diagram of a network node 1000, which may be used as a resource management node 150 and/or a resource node 110, that is configured according to some embodiments. The network node 1000 may be used as the resource management node 150 and/or one or more of the resource nodes 110 of FIG. 1 and be configured to perform the operations of one of more of FIGS. 2-9. The network node 1000 can include one or more network interfaces 1030, one or more processors 1010 (referred to as "processor" for brevity), and one or more memories 1020 (referred to as "memory" for brevity) containing program code 1022.

The processor 1010 may include one or more data processing circuits, such as a general purpose and/or special purpose processor (e.g., microprocessor and/or digital signal processor) that may be collocated or distributed across one or more networks. The processor 1010 is configured to execute program code 1022 in the memory 1020, described below as a computer readable medium, to perform some or all of the operations and methods that are described above for one or more of the embodiments, such as the embodiments of FIGS. 2-9. Accordingly, the processor 1010 can be configured by execution of the program code 1022 to carry out at least some of the functionality disclosed herein to control deployment of resources in a distributed computing system for processing request from user electronic devices.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" and "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A resource management node comprising:
   a processor; and
   a memory coupled to the processor and comprising computer readable program code that when executed by the processor causes the processor to perform operations comprising:
   deploying a group of resource nodes in a distributed computing system;
   distributing requests received from user electronic devices to the resource nodes of the group for processing;
   determining a resource deployment threshold based on performance parameters of the resource nodes of the group, wherein the resource deployment threshold is determined based on an elapsed time from start-up of one of the resource nodes of the group to the one of the resource nodes being ready to process requests from user electronic devices;
   determining a loading metric based on requests received from user electronic devices; and
   controlling further deployment of resource nodes to the group responsive to comparison of the loading metric to the resource deployment threshold.

2. The resource management node of claim 1, wherein:
   deploying the group of resource nodes in the distributed computing system comprises mapping an address of the distributed computing system, which is received in the requests, to a plurality of addresses of the resource nodes of the group; and
   controlling further deployment of resource nodes to the group responsive to comparison of the loading metric to the resource deployment threshold comprises controlling which addresses of resource nodes that are available within the distributed computing system are associated with the address of the distributed computing system.

3. The resource management node of claim 1, wherein:
   the operations further comprise determining a resource shut-down threshold based on the performance parameters of the resource nodes of the group, wherein the resource shut-down threshold is determined based on the elapsed time from start-up of the one of the resource nodes of the group to the one of the resource nodes being ready to process requests from user electronic devices; and
   controlling further deployment of resource nodes to the group responsive to comparison of the loading metric to the resource deployment threshold comprises shutting-down the one of the resource nodes of the group responsive to comparison of the loading metric to the resource shut-down threshold.

4. The resource management node of claim 1, wherein the resource deployment threshold is determined as a value that is closer to the loading metric based on the elapsed time being greater, and the resource deployment threshold is determined as a value that is further from the loading metric based on the elapsed time being smaller.

5. The resource management node of claim 1, wherein determining the resource deployment threshold based on performance parameters of the resource nodes of the group comprises:
   determining the resource deployment threshold based on a combination of the elapsed time and a change in rate of the requests received from the user electronic devices to be processed by the resource nodes of the group.

6. The resource management node of claim 5, wherein the resource deployment threshold is determined as a value that is closer to the loading metric based on an increase in the rate of the requests, and the resource deployment threshold is determined as a value that is further from the loading metric based on a decrease in the rate of the requests.

7. The resource management node of claim 1, wherein determining the resource deployment threshold based on performance parameters of the resource nodes of the group comprises:
   determining the resource deployment threshold based on a combination of the elapsed time and a number of errors detected from the resource nodes of the group processing requests received from the user electronic devices.

8. The resource management node of claim 7, wherein the errors comprise one of failed login attempts by the user electronic devices to application resources processed by resource nodes of the group, the requests identifying resource node addresses which are not accessible among the resource nodes of the group, and communication errors between the resource nodes of the group and the user electronic devices.

9. The resource management node of claim 1, wherein determining the resource deployment threshold based on performance parameters of the resource nodes of the group comprises:
   determining the resource deployment threshold based on a combination of a history of the resource nodes of the group experiencing errors when processing requests at a threshold loading metric and the performance parameters of the resource nodes of the group.

10. The resource management node of claim 1, wherein the operations further comprise:
    determining a performance roll-off relationship between historically determined loading metrics and remaining capability of the resource nodes of the group to provide at least a defined level of processing responsiveness to further requests from user electronic devices;
    determining a projected performance value based on the performance roll-off relationship and the loading metric; and
    determining the resource deployment threshold based on a combination of the elapsed time and the projected performance value.

11. The resource management node of claim 1, wherein the operations further comprise:
    determining a historical trend between time of day and/or day of year and historically determined loading metrics;
    determining a projected loading metric value based on the historical trend and the loading metric; and
    determining the resource deployment threshold based on a combination of the elapsed time and the projected loading metric value.

12. The resource management node of claim 1, wherein determining the resource deployment threshold based on performance parameters of the resource nodes of the group comprises:
    defining a group of application resources that are executed by the resource nodes of the group and are accessed within a threshold time of one another responsive to requests from the user electronic devices; and
    determining the resource deployment threshold based on a combination of the elapsed time and performance requirements of the group of application resources.

13. The resource management node of claim 1, wherein the resource deployment threshold is further determined based on at least one of a defined maximum number of the requests that one of the resource nodes of the group can simultaneously process, an amount of memory available for one of the resource nodes of the group to process the requests, and an amount of throughput available for one of the resource nodes of the group to process the requests.

14. A method in a resource management node comprising:
    deploying a group of resource nodes in a distributed computing system;
    distributing requests received from user electronic devices to the resource nodes of the group for processing;
    determining a resource deployment threshold based on performance parameters of the resource nodes of the group, wherein the resource deployment threshold is determined based on an elapsed time from start-up of one of the resource nodes of the group to the one of the resource nodes being ready to process requests from user electronic devices;
    determining a loading metric based on requests received from user electronic devices; and
    controlling further deployment of resource nodes to the group responsive to comparison of the loading metric to the resource deployment threshold.

15. The method of claim 14, wherein:
    deploying the group of resource nodes in the distributed computing system comprises mapping an address of the distributed computing system, which is received in the requests, to a plurality of addresses of the resource nodes of the group; and
    controlling further deployment of resource nodes to the group responsive to comparison of the loading metric to the resource deployment threshold comprises controlling which addresses of resource nodes that are available within the distributed computing system are associated with the address of the distributed computing system.

16. The method of claim 14,
    further comprising determining a resource shut-down threshold based on the performance parameters of the group of resource nodes, wherein the resource shut-down threshold is determined based on the elapsed time from start-up of the one of the resource nodes of the group to the one of the resource nodes being ready to process requests from user electronic devices, and
    wherein controlling further deployment of resource nodes to the group responsive to comparison of the loading metric to the resource deployment threshold comprises shutting-down the one of the resource nodes of the group responsive to comparison of the loading metric to the resource shut-down threshold.

17. The method of claim 14, wherein:
    the resource deployment threshold is determined as a value that is closer to the loading metric based on the elapsed time being greater, and the resource deployment threshold is determined as a value that is further from the loading metric based on the elapsed time being smaller.

18. The method of claim 14, wherein:
    the resource deployment threshold is determined based on a combination of the elapsed time and a change in rate of the requests received from the user electronic devices to be processed by the resource nodes of the group.

19. The method of claim 14, wherein:
the resource deployment threshold is determined based on a combination of the elapsed time and a number of errors detected from the resource nodes of the group processing requests received from the user electronic devices and the performance parameters of the resource nodes of the group.

20. The method of claim 14, further comprising:
determining a performance roll-off relationship between historically determined loading metrics and remaining capability of the resource nodes of the group to provide at least a defined level of processing responsiveness to further requests from user electronic devices;
determining a projected performance value based on the performance roll-off relationship and the loading metric; and
determining the resource deployment threshold based on a combination of the elapsed time and the projected performance value.

21. The method of claim 14, further comprising:
determining a historical trend between time of day and/or day of year and historically determined loading metrics;
determining a projected loading metric value based on the historical trend and the loading metric; and
determining the resource deployment threshold based on a combination of the elapsed time and the projected loading metric value.

22. The method of claim 14, wherein determining the resource deployment threshold based on performance parameters of the resource nodes of the group comprises:
defining a group of application resources that are executed by the resource nodes of the group and are accessed within a threshold time of one another responsive to requests from the user electronic devices; and
determining the resource deployment threshold based on a combination of the elapsed time and performance requirements of the resource nodes of the group.

23. The method of claim 14, wherein the resource deployment threshold is further determined based on at least one of a defined maximum number of the requests that one of the resource nodes of the group can simultaneously process, an amount of memory available for one of the resource nodes of the group to process the requests, and an amount of throughput available for one of the resource nodes of the group to process the requests.

* * * * *